(12) United States Patent
Castagnola et al.

(10) Patent No.: US 9,333,461 B2
(45) Date of Patent: May 10, 2016

(54) SUBSTRATE MONOLITH COMPRISING SCR CATALYST

(71) Applicant: JOHNSON MATTHEY PUBLIC LIMITED COMPANY, London (GB)

(72) Inventors: Mario Jaime Castagnola, Downingtown, PA (US); Andrew Francis Chiffey, Ware (GB); Paul Richard Phillips, Royston (GB); Raj Rao Rajaram, Slough (GB); Andrew Peter Walker, High Wycombe (GB)

(73) Assignee: Johnson Matthey Public Limited Company, London (GB)

( * ) Notice: Subject to any disclaimer, the term of this patent is extended or adjusted under 35 U.S.C. 154(b) by 584 days.

(21) Appl. No.: 13/711,134

(22) Filed: Dec. 11, 2012

(65) Prior Publication Data

US 2013/0149207 A1    Jun. 13, 2013

Related U.S. Application Data

(60) Provisional application No. 61/569,535, filed on Dec. 12, 2011.

(30) Foreign Application Priority Data

Jan. 18, 2012    (GB) .................................. 1200783.7

(51) Int. Cl.
*B01D 50/00*    (2006.01)
*B01D 53/94*    (2006.01)
(Continued)

(52) U.S. Cl.
CPC ........ *B01D 53/9418* (2013.01); *B01D 53/9472* (2013.01); *B01D 53/9481* (2013.01);
(Continued)

(58) Field of Classification Search
CPC ........ F01N 3/035; F01N 3/2066; B01J 23/50; B01J 23/63; B01D 2255/1021; B01D 2255/104; B01D 2255/502
USPC .......................... 422/177, 180; 502/263, 330
See application file for complete search history.

(56) References Cited

U.S. PATENT DOCUMENTS 5,473,887 A    12/1995    Takeshima et al.
6,080,375 A    6/2000    Mussmann et al.
(Continued)

FOREIGN PATENT DOCUMENTS

DE    60020070 T2    1/2006
DE    112012002601 T5    3/2014
(Continued)

OTHER PUBLICATIONS

Cavataio, G. et al., "Impact and Prevention of Ultra-Low Contamination of Platinum Group Metals on SCR Catalysts Due to Doc Design," 2009, SAE Technical Paper 2009-01-0627.
(Continued)

*Primary Examiner* — Tom P Duong
(74) *Attorney, Agent, or Firm* — Gary D. Mangels

(57) ABSTRACT

A substrate monolith 6 having a length L and comprising a first zone 11 of substantially uniform length defined at one end by a first end of the substrate monolith, which first zone comprising a selective catalytic reduction (SCR) catalyst for reducing oxides of nitrogen with a nitrogenous reductant in exhaust gas emitted from an internal combustion engine and a second zone 8 of substantially uniform length less than L defined at one end by a second end of the substrate monolith, which second zone comprising (a) at least one particulate metal oxide or a mixture of any two or more thereof for trapping gas phase platinum group metal (PGM), which at least one particulate metal oxide does not act as a support for any other catalytic component; or (b) a component capable of trapping and/or alloying with gas phase PGM.

14 Claims, 3 Drawing Sheets

(51) Int. Cl.
| | | |
|---|---|---|
| *B01J 35/00* | (2006.01) | |
| *B01J 35/04* | (2006.01) | |
| *F01N 3/20* | (2006.01) | |
| *F01N 3/035* | (2006.01) | |
| *B01J 37/02* | (2006.01) | |
| *B01J 37/03* | (2006.01) | |
| *B01J 23/40* | (2006.01) | |
| *B01J 23/42* | (2006.01) | |
| *B01J 23/44* | (2006.01) | |
| *B01J 23/50* | (2006.01) | |
| *B01J 23/52* | (2006.01) | |
| *B01J 23/63* | (2006.01) | |
| *B01J 29/74* | (2006.01) | |
| *B01J 29/76* | (2006.01) | |
| *B01J 37/00* | (2006.01) | |
| *B01J 21/04* | (2006.01) | |
| *B01J 23/72* | (2006.01) | |

(52) U.S. Cl.
CPC .............. *B01J 21/04* (2013.01); *B01J 23/40* (2013.01); *B01J 23/42* (2013.01); *B01J 23/44* (2013.01); *B01J 23/50* (2013.01); *B01J 23/52* (2013.01); *B01J 23/63* (2013.01); *B01J 23/72* (2013.01); *B01J 29/7415* (2013.01); *B01J 29/7615* (2013.01); *B01J 35/0006* (2013.01); *B01J 35/04* (2013.01); *B01J 37/0036* (2013.01); *B01J 37/0215* (2013.01); *B01J 37/0246* (2013.01); *B01J 37/038* (2013.01); *F01N 3/035* (2013.01); *F01N 3/2066* (2013.01); *B01D 2255/104* (2013.01); *B01D 2255/106* (2013.01); *B01D 2255/1021* (2013.01); *B01D 2255/1023* (2013.01); *B01D 2255/20738* (2013.01); *B01D 2255/50* (2013.01); *B01D 2255/502* (2013.01); *B01J 2229/186* (2013.01); *B01J 2229/42* (2013.01); *F01N 2510/0682* (2013.01); *Y02T 10/24* (2013.01)

(56) References Cited

U.S. PATENT DOCUMENTS

| | | | |
|---|---|---|---|
| 6,093,378 | A | 7/2000 | Deeba et al. |
| 6,348,430 | B1 | 2/2002 | Lindner et al. |
| 6,835,689 | B1 | 12/2004 | He et al. |
| 7,550,124 | B2 | 6/2009 | Chen et al. |
| 7,758,834 | B2 | 7/2010 | Chen et al. |
| 8,252,258 | B2 | 8/2012 | Muller-Stach et al. |
| 8,318,632 | B2 | 11/2012 | Matsueda et al. |
| 8,415,269 | B2 | 4/2013 | Hao et al. |
| 8,863,507 | B2 | 10/2014 | Adelmann et al. |
| 2001/0053340 | A1 | 12/2001 | Noda et al. |
| 2006/0057046 | A1 | 3/2006 | Punke et al. |
| 2007/0157607 | A1 | 7/2007 | Pfefferle |
| 2008/0045405 | A1 | 2/2008 | Beutel et al. |
| 2008/0125308 | A1 | 5/2008 | Fujdala et al. |
| 2009/0196812 | A1 | 8/2009 | Bull et al. |
| 2009/0260349 | A1 | 10/2009 | Gandhi et al. |
| 2009/0285737 | A1 | 11/2009 | Bull et al. |
| 2010/0016150 | A1 | 1/2010 | Yabuzaki et al. |
| 2010/0166629 | A1 | 7/2010 | Deeba |
| 2010/0175372 | A1 | 7/2010 | Lambert et al. |
| 2010/0180581 | A1 | 7/2010 | Grubert et al. |
| 2010/0183490 | A1 | 7/2010 | Hoke et al. |
| 2010/0215557 | A1 | 8/2010 | Liu et al. |
| 2010/0221154 | A1 | 9/2010 | Lee et al. |
| 2010/0263357 | A1 | 10/2010 | Lindner et al. |
| 2010/0290964 | A1 | 11/2010 | Southward et al. |
| 2011/0014099 | A1 | 1/2011 | Dornhaus et al. |
| 2011/0064632 | A1 | 3/2011 | Huang et al. |
| 2011/0064633 | A1 | 3/2011 | Huang et al. |
| 2011/0099975 | A1 | 5/2011 | Bailey et al. |
| 2011/0138777 | A1 | 6/2011 | Jen et al. |
| 2011/0143921 | A1 | 6/2011 | Hao et al. |
| 2011/0173950 | A1 | 7/2011 | Wan et al. |
| 2011/0206584 | A1 | 8/2011 | Dobson et al. |
| 2011/0271664 | A1* | 11/2011 | Boorse et al. .................. 60/301 |
| 2011/0274606 | A1* | 11/2011 | Melville et al. ............ 423/239.1 |
| 2011/0286900 | A1 | 11/2011 | Caudle et al. |
| 2012/0128558 | A1 | 5/2012 | Nunan et al. |
| 2013/0084222 | A1 | 4/2013 | Grubert et al. |
| 2013/0089481 | A1 | 4/2013 | Sumiya et al. |
| 2013/0149221 | A1 | 6/2013 | Blakeman et al. |
| 2013/0149222 | A1 | 6/2013 | Blakeman et al. |
| 2013/0149223 | A1 | 6/2013 | Blakeman et al. |

FOREIGN PATENT DOCUMENTS

| | | |
|---|---|---|
| EP | 0341832 A2 | 11/1989 |
| EP | 0622107 A2 | 11/1994 |
| EP | 0766993 A2 | 4/1997 |
| EP | 1399246 B1 | 3/2004 |
| EP | 1925362 A2 | 5/2008 |
| EP | 2116293 A1 | 11/2009 |
| EP | 2520354 A1 | 11/2012 |
| EP | 2535102 A1 | 12/2012 |
| GB | 2375059 A1 | 11/2002 |
| GB | 2406803 A | 4/2005 |
| JP | 62068544 | 3/1987 |
| JP | 4022707 | 1/1992 |
| JP | 09-271674 | 10/1997 |
| JP | 2006-272064 | 10/2006 |
| JP | 2007-229679 | 9/2007 |
| JP | 2008-279352 | 11/2008 |
| WO | 96/39244 A1 | 12/1996 |
| WO | 9947260 A1 | 9/1999 |
| WO | 00/59630 A1 | 10/2000 |
| WO | 0112320 A1 | 2/2001 |
| WO | 2005016497 A1 | 2/2005 |
| WO | 2008132452 A2 | 11/2008 |
| WO | 2009093071 A1 | 7/2009 |
| WO | 2009/136206 A1 | 11/2009 |
| WO | 2010/075345 A2 | 7/2010 |
| WO | 2010/133309 A1 | 11/2010 |
| WO | 2011/082357 A2 | 7/2011 |
| WO | 2011080525 A1 | 7/2011 |
| WO | 2011092521 A1 | 8/2011 |
| WO | 2011131324 A1 | 10/2011 |
| WO | 2012/133055 A1 | 10/2012 |
| WO | 2012/147376 A1 | 11/2012 |
| WO | 2012/156883 A1 | 11/2012 |
| WO | 2012/175948 A1 | 12/2012 |
| WO | 2012170421 A1 | 12/2012 |
| WO | 2012175948 A1 | 12/2012 |

OTHER PUBLICATIONS

Jen, H-W. et al., "Detection, Origin and Effect of Ultra-Low Platinum Contamination on Diesel-SCR Catalysts," Powertrains, Fuels & Lubricants Meeting, Rosemont, Illinois, Oct. 6-9, 2008, SAE Technical Paper 2008-01-2488.

GB Search Report dated May 18, 2012 for corresponding Application No. GB1200783.7 filed Jan. 18, 2012.

GB Search Report dated Jan. 15, 2013 for corresponding Application No. GB1222229.5 filed Dec. 11, 2012.

Partial International Search Report dated Jun. 6, 2013 for corresponding International Application No. PCT/GB2012/053083 filed Dec. 11, 2012.

* cited by examiner

SUBSTRATE MONOLITH COMPRISING SCR CATALYST

CROSS REFERENCE TO RELATED APPLICATIONS

This application claims priority benefit to U.S. Provisional Patent Application No. 61/569,535 filed on Dec. 12, 2011, and Great Britain Patent Application No. 1200783.7 filed on Jan. 18, 2012, both of which are incorporated herein by reference.

FIELD OF THE INVENTION

The present invention relates to a substrate monolith comprising a selective catalytic reduction (SCR) catalyst for reducing oxides of nitrogen with a nitrogenous reductant in exhaust gas emitted from an internal combustion engine, such as a vehicular internal combustion engine, which substrate monolith is designed to reduce or avoid contamination of the SCR catalyst, and consequent loss of $NO_x$ conversion activity, from platinum group metals (PGM), particularly platinum that may be volatilised from upstream PGM-containing catalysts.

BACKGROUND TO THE INVENTION

Generally, there are four classes of pollutant that are legislated against by inter-governmental organisations throughout the world: carbon monoxide (CO), unburned hydrocarbons (HC), oxides of nitrogen ($NO_x$) and particulate matter (PM).

As emissions standards for permissible emission of such pollutants in exhaust gases from vehicular engines become progressively tightened, a combination of engine management and multiple catalyst exhaust gas aftertreatment systems are being proposed and developed to meet these emission standards. For exhaust systems containing a particulate filter, it is common for engine management to be used periodically (e.g. every 500 km) to increase the temperature in the filter in order to combust substantially all remaining soot held on the filter thereby to return the system to a base-line level. These engine managed soot combustion events are often called "filter regeneration". While a primary focus of filter regeneration is to combust soot held on the filter, an unintended consequence is that one or more catalyst coatings present in the exhaust system, e.g. a filter coating on the filter itself (a so-called catalysed soot filter (CSF)) an oxidation catalyst (such as a diesel oxidation catalyst (DOC)) or a $NO_x$ adsorber catalyst (NAC) located upstream or downstream of the filter (e.g. a first DOC followed by a diesel particulate filter, followed in turn by a second DOC and finally a SCR catalyst) can be regularly exposed to high exhaust gas temperatures, depending on the level of engine management control in the system. Such conditions may also be experienced with unintended occasional engine upset modes or uncontrolled or poorly controlled regeneration events. However, some diesel engines, particularly heavy duty diesel engines operating at high load, may even expose catalysts to significant temperatures, e.g. >600° C. under normal operating conditions.

As vehicle manufacturers develop their engines and engine management systems for meeting the emission standards, the Applicant/Assignee is being asked by the vehicle manufacturers to propose catalytic components and combinations of catalytic components to assist in the goal of meeting the emission standards. Such components include DOCs for oxidising CO, HCs and optionally NO also; CSFs for oxidising CO, HCs, optionally for oxidising NO also, and for trapping particulate matter for subsequent combustion; NACs for oxidising CO and HC and for oxidising nitrogen monoxide (NO) and absorbing it from a lean exhaust gas and to desorb adsorbed $NO_x$ and for reducing it to $N_2$ in a rich exhaust gas (see below); and selective catalytic reduction (SCR) catalysts for reducing $NO_x$ to $N_2$ in the presence of a nitrogenous reductant, such as ammonia (see below).

In practice, catalyst compositions employed in DOCs and CSFs are quite similar. Generally, however, a principle difference between the use of a DOC and a CSF is the substrate monolith onto which the catalyst composition is coated: in the case of a DOC, the substrate monolith is typically a flow-through substrate monolith, comprising a metal or ceramic honeycomb monolith having an array of elongate channels extending therethrough, which channels are open at both ends; a CSF substrate monolith is a filtering monolith such as a wall-flow filter, e.g. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternately separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing back-pressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition. However, in particular embodiments of the present invention, the filter inlet is coated with one or more layers, which layers may be the same or a different catalyst composition. It has also been proposed to coat a NAC composition on a filtering substrate monolith (see e.g. EP 0766993).

In exhaust systems comprising multiple catalyst components, each comprising a separate substrate monolith, typically, the SCR catalyst is located downstream of a DOC and/or a CSF and/or a NAC because it is known that by oxidising some nitrogen oxide (NO) in the exhaust gas to nitrogen dioxide ($NO_2$) so that there is about a 1:1 ratio of $NO:NO_2$ exiting the DOC and/or the CSF and/or the NAC, the downstream SCR reaction is promoted (see below). It is also well known from EP341832 (the so-called Continuously Regenerating Trap or CRT®) that $NO_2$, generated by oxidising NO in exhaust gas to $NO_2$, can be used to combust soot passively on a downstream filter. In exhaust system arrangements where the process of EP341832 is important, were the SCR catalyst to be located upstream of the filter, this would reduce or prevent the process of combusting trapped soot in $NO_2$, because a majority of the $NO_x$ used for combusting the soot would likely be removed on the SCR catalyst.

However, a preferred system arrangement for light-duty diesel vehicles is a diesel oxidation catalyst (DOC) followed by a nitrogenous reductant injector, then a SCR catalyst and finally a catalysed soot filter (CSF). A short hand for such an arrangement is "DOC/SCR/CSF". This arrangement is preferred for light-duty diesel vehicles because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible. Were a large thermal mass filter to be placed upstream of the SCR catalyst, i.e. between the DOC and the SCR catalyst ("DOC/CSF/SCR"), (i) and (ii) would take far longer to achieve and $NO_x$ conversion as a whole of the emission standard drive cycle could be reduced. Particulate removal can be done using oxygen and occasional forced regeneration of the filter using engine management techniques.

It has also been proposed to coat a SCR catalyst washcoat on a filter substrate monolith itself (see e.g. WO 2005/016497), in which case an oxidation catalyst may be located upstream of the SCR-coated filter substrate (whether the oxidation catalyst is a component of a DOC, a CSF or a NAC) in order to modify the $NO/NO_2$ ratio for promoting $NO_x$ reduction activity on the SCR catalyst. There have also been proposals to locate a NAC upstream of a SCR catalyst disposed on a flow-through substrate monolith, which NAC can generate $NH_3$ in situ during regeneration of the NAC (see below). One such proposal is disclosed in GB 2375059.

NACs are known e.g. from U.S. Pat. No. 5,473,887 and are designed to adsorb $NO_x$ from lean exhaust gas (lambda>1) and to desorb the $NO_x$ when the oxygen concentration in the exhaust gas is decreased. Desorbed $NO_x$ may be reduced to $N_2$ with a suitable reductant, e.g. engine fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, (i.e. substantially more than is required for use as a promoter such as a promoter in a three-way catalyst), of a $NO_x$-storage component, such as barium, and a reduction catalyst, e.g. rhodium. One mechanism commonly given for $NO_x$-storage from a lean exhaust gas for this formulation is:

$$NO + \tfrac{1}{2} O_2 \rightarrow NO_2 \quad (1); \text{ and}$$

$$BaO + 2NO_2 + \tfrac{1}{2}O_2 \rightarrow Ba(NO_3)_2 \quad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + \tfrac{3}{2}O_2 \text{ or } Ba(NO_3)_2 \rightarrow BaO + 2NO_2 + \tfrac{1}{2}O_2 \quad (3); \text{ and}$$

$$NO + CO \rightarrow \tfrac{1}{2}N_2 + CO_2 \quad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) inclusive herein above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of CO to $CO_2$ and unburned HCs to $CO_2$ and $H_2O$. Typical oxidation catalysts include platinum and/or palladium on a high surface area support.

The application of SCR technology to treat $NO_x$ emissions from vehicular internal combustion (IC) engines, particularly lean-burn IC engines, is well known. Examples of nitrogenous reductants that may be used in the SCR reaction include compounds such as nitrogen hydrides, e.g. ammonia ($NH_3$) or hydrazine, or an $NH_3$ precursor.

$NH_3$ precursors are one or more compounds from which $NH_3$ can be derived, e.g. by hydrolysis. Decomposition of the precursor to ammonia and other by-products can be by hydrothermal or catalytic hydrolysis. $NH_3$ precursors include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature. Presently, urea is the preferred source of $NH_3$ for mobile applications because it is less toxic than $NH_3$, it is easy to transport and handle, is inexpensive and commonly available. Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable.

SCR has three main reactions (represented below in reactions (5)-(7) inclusive) which reduce $NO_x$ to elemental nitrogen.

$$4NH_3 + 4NO + O_2 \rightarrow 4N_2 + 6H_2O \text{ (i.e. 1:1 } NH_3:NO) \quad (5)$$

$$4NH_3 + 2NO + 2NO_2 \rightarrow 4N_2 + 6H_2O \text{ (i.e. 1:1 } NH_3:NO_x) \quad (6)$$

$$8NH_3 + 6NO_2 \rightarrow 7N_2 + 12H_2O \text{ (i.e. 4:3 } NH_3:NO_x) \quad (7)$$

A relevant undesirable, non-selective side-reaction is:

$$2NH_3 + 2NO_2 \rightarrow N_2O + 3H_2O + N_2 \quad (8)$$

In practice, reaction (7) is relatively slow compared with reaction (5) and reaction (6) is quickest of all. For this reason, when skilled technologists design exhaust aftertreatment systems for vehicles, they often prefer to dispose an oxidation catalyst element (e.g. a DOC and/or a CSF and/or a NAC) upstream of an SCR catalyst.

When certain DOCs and/or NACs and/or CSFs become exposed to the high temperatures encountered e.g. during filter regeneration and/or an engine upset event and/or (in certain heavy-duty diesel application) normal high temperature exhaust gas, it is possible given sufficient time at high temperature for low levels of platinum group metal components, particularly Pt, to volatilise from the DOC and/or the NAC and/or the CSF components and subsequently for the platinum group metal to become trapped on a downstream SCR catalyst. This can have a highly detrimental effect on the performance of the SCR catalyst, since the presence of Pt leads to a high activity for competing, non-selective ammonia oxidation such as in reaction (9) (which shows the complete oxidation of $NH_3$), thereby producing secondary emissions and/or unproductively consuming $NH_3$.

$$4NH_3 + 5O_2 \rightarrow 4NO + 6H_2O \qquad (9)$$

One vehicle manufacturer has reported the observation of this phenomenon in SAE paper 2009-01-0627, which is entitled "Impact and Prevention of Ultra-Low Contamination of Platinum Group Metals on SCR catalysts Due to DOC Design" and includes data comparing the $NO_x$ conversion activity against temperature for a Fe/zeolite SCR catalyst located in series behind four suppliers' platinum group metal (PGM)-containing DOCs that were contacted with a flowing model exhaust gas at 850° C. for 16 hours. The results presented show that the $NO_x$ conversion activity of a Fe/zeolite SCR catalyst disposed behind a 20Pt:Pd DOC at 70 gft$^{-3}$ total PGM was negatively altered at higher evaluation temperatures as compared to lower evaluation temperatures as a result of Pt contamination. Two 2Pt:Pd DOCs from different suppliers at 105 gft$^{-3}$ total PGM were also tested. In a first 2Pt:Pd DOC, the SCR catalyst activity was affected to a similar extent as the test on the 20Pt:Pd DOC, whereas for the second 2Pt:Pd DOC tested the SCR catalyst activity was contaminated to a lesser extent, although the second 2Pt:Pd DOC still showed reduced $NO_x$ conversion activity compared with the blank control (no DOC, just a bare substrate). The authors concluded that the supplier of the second 2Pt:Pd DOC, which showed more moderate $NO_x$ conversion degradation, was more successful in stabilising the 70 gft$^{-3}$ Pt present with the 35 gft$^{-3}$ Pd. A Pd-only DOC at 150 gft$^{-3}$ demonstrated no impact on the downstream SCR relative to the blank control. Earlier work from the authors of SAE 2009-01-0627 was published in SAE paper no. 2008-01-2488.

SUMMARY OF THE INVENTION

Vehicle manufacturers have begun asking the Applicant for measures to solve the problem of volatilisation of relatively low levels PGMs from components upstream of SCR catalysts. It would be highly desirable to develop strategies to prevent this PGM movement onto a downstream SCR catalyst at high temperatures. The present inventors have developed a number of strategies for meeting this need.

The inventors have found that volatilisation of platinum from a PGM-containing catalyst comprising platinum and both platinum and palladium can occur under extreme temperature conditions. For example, in some experiments, Pt volatilisation can occur when the weight ratio of Pt:Pd is greater than about 2:1. It is also believed that where the PGM consists of platinum, platinum volatilisation may also be observed. The present inventors have devised a substrate monolith comprising a SCR catalyst and an exhaust system arrangement including this substrate monolith which avoid or reduce the problem of PGM, particularly Pt, migrating from an upstream relatively highly loaded Pt catalyst to a downstream SCR catalyst.

According to a first aspect, the invention provides a substrate monolith having a length L and comprising a first zone of substantially uniform length defined at one end by a first end of the substrate monolith, which first zone comprising a selective catalytic reduction (SCR) catalyst for reducing oxides of nitrogen with a nitrogenous reductant in exhaust gas emitted from an internal combustion engine and a second zone of substantially uniform length less than L defined at one end by a second end of the substrate monolith, which second zone comprising (a) at least one particulate metal oxide or a mixture of any two or more thereof for trapping gas phase platinum group metal (PGM), which at least one particulate metal oxide does not act as a support for any other catalytic component; or (b) a component capable of trapping and/or alloying with gas phase PGM. The first zone or first end of the substrate monolith is generally different to the second zone or second end of the substrate monolith.

According to a further aspect, the invention provides an exhaust system for a vehicular lean burn internal combustion engine, which system comprises a substrate monolith of the invention, and wherein the second zone and/or the second end of the substrate monolith is oriented to an upstream side (e.g. the first zone and/or the first end of the substrate monolith is oriented to a downstream side). Typically, the exhaust system further comprises a catalysed substrate monolith, wherein the catalysed substrate monolith comprises a catalyst comprising platinum, and wherein the catalysed substrate monolith and/or the platinum is disposed upstream of the substrate monolith of the invention.

The invention further provides a lean-burn internal combustion engine comprising an exhaust system of the invention. The lean-burn internal combustion engine may be a compression ignition engine.

According to a further aspect, there is provided a vehicle comprising an exhaust system of the invention. Typically, the vehicle further comprises an engine (e.g. an internal combustion engine), such as a lean-burn internal combustion engine, particularly a compression ignition engine.

In a further aspect, there is provided a method of reducing or preventing platinum group metal from poisoning a selective catalytic reduction (SCR) catalyst for reducing oxides of nitrogen with a nitrogenous reductant in exhaust gas emitted from an internal combustion engine in an exhaust system of a lean-burn internal combustion engine, which platinum group metal (PGM) is present on a catalysed substrate monolith of an exhaust system of a lean-burn internal combustion engine and, typically is liable to volatilise when in use and migrate to a surface of a substrate monolith comprising the SCR catalyst, wherein a substrate monolith comprising an SCR catalyst is disposed downstream of the catalysed substrate monolith, which substrate monolith having a length L and comprising a first zone of substantially uniform length defined at one end by a first end of the substrate monolith, which first zone comprising a selective catalytic reduction (SCR) catalyst for reducing oxides of nitrogen with a nitrogenous reductant in exhaust gas emitted from an internal combustion engine and a second zone of substantially uniform length less than L defined at one end by a second end of the substrate monolith, which second zone comprising (a) at least one particulate metal oxide or a mixture of any two or more thereof for trapping gas phase PGM, which at least one particulate metal oxide does not act as a support for any other catalytic component; or (b) a component capable of trapping and alloying with gas phase PGM and wherein the second zone is oriented to contact exhaust gas exiting the catalysed substrate monolith before the first zone, which method comprising trapping and/or alloying PGM in the second zone.

A further aspect of the invention relates to the use of a particulate metal oxide (e.g. at least one particulate metal oxide or a mixture of any two or more thereof) or a component capable of trapping and/or alloying with gas phase platinum group metal (PGM) to reduce or prevent poisoning of a selective catalytic reduction (SCR) catalyst by a platinum group metal (PGM), typically in an exhaust system of a lean-burn internal combustion engine, wherein the exhaust system comprises a substrate monolith having a length L and comprising a first zone of substantially uniform length defined at one end by a first end of the substrate monolith, which first zone comprising a selective catalytic reduction (SCR) catalyst for reducing oxides of nitrogen with a nitrogenous reductant in exhaust gas emitted from an internal combustion engine and a second zone of substantially uniform length less than L defined at one end by a second end of the substrate monolith, which second zone comprises (a) the particulate metal oxide for trapping gas phase platinum group metal (PGM) and, preferably which particulate metal oxide does not act as a support for any other catalytic component, or (b) the component capable of trapping and/or alloying with gas phase PGM. Typically, the second zone and/or the second end of the substrate monolith is oriented to an upstream side (e.g. the first zone and/or the first end of the substrate monolith is oriented to a downstream side).

BRIEF DESCRIPTION OF THE DRAWINGS

In order that the invention may be more fully understood, reference is made to the following embodiment and Examples by way of illustration only and with reference to the accompanying drawings.

DETAILED DESCRIPTION OF THE INVENTION

Figure 1:
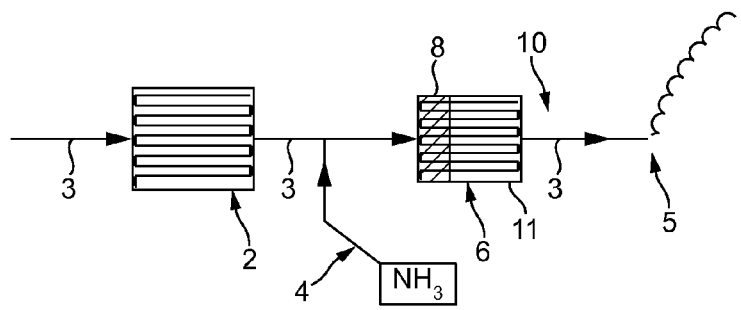
FIG. 1 is a schematic drawing of an exhaust system according to the present invention.

Typically, the particulate metal oxide (i.e. the at least one particulate metal oxide of (a)) can be selected from the group consisting of optionally stabilised alumina, amorphous silica-alumina, optionally stabilised zirconia, ceria, titania, an optionally stabilised ceria-zirconia mixed oxide and mixtures of any two or more thereof. By "does not act as a support for any other catalytic component" herein is meant that the at least one particulate metal oxide does not support any catalyst compositions comprising alkali metals, alkaline earth metals or transition metals (including lanthanides) or elements of group IIIA, IVA, VA or VIA (according to the Chemical Abstracts Service (c. 1999)) of the periodic table.

The second zone may, typically, comprise a particulate metal oxide in a total amount of 0.1 to 5 g in$^{-3}$, preferably 0.2 to 4 g in$^{-3}$ (e.g. 0.5 to 3.5 g in$^{-3}$), more preferably 1 to 2.5 g in$^{-3}$.

The component capable of trapping and/or alloying with gas phase PGM (e.g. component (b)) typically comprises a metal selected from the group consisting of gold, palladium and silver. Preferably, component (b) comprises a mixture or an alloy of palladium and gold.

Typically, the total amount of component (b) is from 10 to 350 g ft$^{-3}$. It is preferred that the total amount of component (b) is 20 to 300 g ft$^{-3}$, more preferably 30 to 250 g ft$^{-3}$, still more preferably, 45 to 200 g ft$^{-3}$, and even more preferably 50 to 175 g ft$^{-3}$.

The second zone and the first zone comprising the SCR catalyst in the substrate monolith can be arranged in a number of different ways. For example, the first zone can extend over the entire length L, and the second zone can overlie the first zone. The SCR catalyst can be of the extruded type (also sometimes referred to as a "catalyst body"), or a coating to be applied to an inert substrate monolith. The component (b) capable of trapping and alloying with gas phase platinum e.g. the palladium, gold, silver or palladium and gold, can be supported by the SCR catalyst per se, or component (b) comprises at least one metal oxide on which the component capable of trapping and alloying with gas phase PGM is supported. Methods of impregnating a SCR catalyst with a PGM to form a zone for selectively oxidising NH$_3$ that slips past the SCR catalyst to dinitrogen are known e.g. from EP 1399246 and the opposition thereto.

Where the second zone comprises a coating, the zone is generally applied as a washcoat coating comprising a support material. Support materials known in the art include optionally stabilised alumina, titania, ceria, optionally stabilised zirconia, mixed oxides containing ceria such as ceria-zirconia possibly further stabilised with one or more rare earth elements, silica, amorphous silica alumina etc.

Substrate monoliths for use in the present invention can be ceramic, such as cordierite, aluminium titanate, silicon carbide or the like; or metallic, made e.g. of thin metal foils of ferritic iron-chromium-aluminium alloys. The arrangement of such substrate monoliths can be non-filtering, such as so called flow-through monoliths wherein open channels extend from a first end to a second end, or filtering substrate monoliths can be used having inlet surfaces and outlet surfaces, wherein the inlet surfaces are separated from the outlet surfaces by a porous structure. Preferred filtering substrate monoliths are wall-flow filters, as described hereinabove.

Catalysed filters, preferably wall-flow filters, can be coated using the method disclosed in Applicant/Assignee's WO 2011/080525. That is, a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition may be coated on filter channels from a first end, following which the coated filter can be dried.

Use of such a method can be controlled using, e.g. vacuum strength, vacuum duration, washcoat viscosity, washcoat solids, coating particle or agglomerate size and surface tension so that catalyst is coated predominantly on the inlet surfaces but also optionally within the porous structure but near to the inlet surfaces. Alternatively, the washcoat components may be milled to a size, e.g. D90<5 µm, so that they "permeate" the porous structure of the filter (see WO 2005/016497).

The term "substantially uniform length" as used herein refers to the length of layer that does not deviate by more than 10%, preferably does not deviate by more than 5%, more preferably does not deviate by more than 1%, from the mean value of the length of the layer. When the substrate monolith comprises (a) or (b), the SCR catalyst in the first zone may be present as a coating on the substrate monolith of substantially uniform length less than L. Typically, there is substantially no overlap between the first zone comprising (a) or (b) and the second zone. It is preferred that component (b) comprises at least one metal oxide on which the component capable of trapping and alloying with gas phase PGM is supported.

When the substrate monolith is a wall-flow filter, the SCR catalyst can be disposed in open channels at the first end of the wall-flow filter and the second zone is disposed in open channels at the second end thereof, wherein the porous structure defines a transition between the first washcoat zone and the second washcoat zone.

The substrate monolith according to the invention comprises a catalyst for selectively catalysing the reduction of oxides of nitrogen to dinitrogen with a nitrogenous reductant, also known as a selective catalytic reduction (SCR) catalyst. The SCR catalyst may be coated as a coating onto a substrate monolith, such as described hereinabove. Alternatively, the SCR catalyst is provided as an extrudate (also known as a "catalyst body"), i.e. the catalyst is mixed with components of the substrate monolith structure, which are both extruded, so the catalyst is part of the walls of the substrate monolith. It is also possible to make a wall-flow filter from an extruded SCR catalyst (see Applicant/Assignee's WO 2009/093071 and WO 2011/092521). SCR catalysts for use in the present invention can be selected from the group consisting of at least one of Cu, Hf, La, Au, In, V, lanthanides and Group VIII transition metals, such as Fe, supported on a refractory oxide or molecular sieve. Preferred metals of particular interest are selected from the group consisting of Ce, Fe and Cu. Suitable refractory oxides include $Al_2O_3$, $TiO_2$, $CeO_2$, $SiO_2$, $ZrO_2$ and mixed oxides containing two or more thereof. Non-zeolite catalyst can also include tungsten oxide, e.g. $V_2O_5/WO_3/TiO_2$. Preferred metals of particular interest are selected from the group consisting of Ce, Fe and Cu. Molecular sieves can be ion-exchanged with the above metals.

In general, the at least one molecular sieve, is an aluminosilicate zeolite or a SAPO. The at least one molecular sieve can be a small, a medium or a large pore molecular sieve, for example. By "small pore molecular sieve" herein we mean a molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example Applicant/Assignee's WO 2008/132452. Molecular sieves for use in SCR catalysts according to the invention include one or more metals incorporated into a framework of the molecular sieve e.g. Fe "in-framework" Beta and Cu "in-framework" CHA.

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1, with CHA molecular sieves, e.g. aluminosilicate CHA, currently preferred, particularly in combination with Cu as promoter, e.g. ion-exchanged.

Typically, the exhaust system of the invention further comprises means (e.g. an injector) for injecting a nitrogenous reductant into exhaust gas. In general, the means for injecting a nitrogenous reductant is disposed upstream of the substrate monolith. Thus, a nitrogenous reductant can be added to an exhaust gas and fed into an inlet, typically at a second end, of the substrate monolith.

Nitrogenous reductants and precursors thereof for use in the present invention include any of those mentioned hereinabove in connection with the background section. Thus, for example, the nitrogenous reductant is preferably ammonia or urea.

It is preferred that the means for injecting a nitrogenous reductant (e.g. ammonia or a precursor thereof, such as urea) is disposed between the catalysed substrate monolith and the substrate monolith comprising the SCR catalyst. Precursors of ammonia can be any of those mentioned in background section hereinabove.

The catalyst comprising platinum can be a diesel oxidation catalyst or a $NO_x$ absorber catalyst, optionally each having the composition described in the background section hereinabove. Where a diesel oxidation catalyst is disposed on a filtering substrate, e.g. a wall-flow filter, it is known herein as a catalysed soot filter or CSF.

Typically, the catalyst (i.e. the catalyst comprising platinum) comprises both platinum and palladium.

Since the substrate monolith according to the invention comprises a measure to reduce or prevent platinum from volatilising and migrating from the catalyst comprising platinum to a downstream SCR catalyst, it is possible for relatively high Pt:Pd weight ratios to be used in the catalyst comprising platinum for the purposes of, e.g. generating $NO_2$ to promote downstream combustion of filtered particulate matter, such as ≤10:1, e.g. 8:1, 6:1, 5:1 or 4:1. It is possible to use such relatively high Pt:Pd weight ratios, even though PGM may volatilise therefrom because the design of the substrate monolith according to the first aspect of the invention substantially prevents volatilised PGM from contacting the SCR catalyst.

The catalyst comprising platinum may be disposed immediately upstream of the substrate monolith comprising the SCR catalyst (i.e. without any intervening substrate monolith between the catalysed substrate monolith and the substrate monolith of the present invention e.g. comprising the SCR catalyst).

In general, and especially when the catalyst comprising platinum is disposed immediately upstream of the substrate monolith (i.e. comprising the SCR catalyst), the catalyst (i.e. the catalyst comprising platinum) comprises both platinum and palladium in a weight ratio of Pt:Pd is ≤2, such as ≤1.5:1, e.g. about 1:1. The significance of this feature is shown in the Examples: the inventors have found that the preferred Pt:Pd weight ratios volatilise less, by empiric testing, than a similar catalyst having a Pt:Pd weight ratio of 4:1. In layered catalyst arrangements, it is preferred that an outer layer has a Pt:Pd weight ratio of ≤2, or optionally that the overall Pt:Pd weight ratio of all layers combined is ≤2.

Typically, the weight ratio of Pt:Pd is ≥35:65 (e.g. ≥7:13). It is preferred that the weight ratio Pt:Pd is ≥40:60 (e.g. ≥2:3), more preferably ≥42.5:57.5 (e.g. ≥17:23), particularly ≥45:55 (e.g. ≥9:11), such as ≥50:50 (e.g. ≥1:1), and still more preferably ≥1.25:1. The weight ratio of Pt:Pd is typically 10:1 to 7:13. It is preferred that the weight ratio of Pt:Pd is 8:1 to 2:3, more preferably 6:1 to 17:23, even more preferably 5:1 to 9:11, such as 4:1 to 1:1, and still more preferably 2:1 to 1.25:1.

Generally, the total amount of the platinum group metal (PGM) (e.g. the total amount of Pt and/or Pd) is 1 to 500 g ft$^{-3}$. Preferably, the total amount of the PGM is 5 to 400 g ft$^{-3}$, more preferably 10 to 300 g ft$^{-3}$, still more preferably, 25 to 250 g ft$^{-3}$, and even more preferably 35 to 200 g ft$^{-3}$.

The invention also provides a lean-burn internal combustion engine comprising an exhaust system according to the invention. The lean-burn internal combustion engine can be a positive ignition, e.g. a spark ignition, engine that typically runs on gasoline fuel or blends of gasoline fuel and other components such as ethanol, but is preferably a compression ignition, e.g. a diesel-type engine. Lean-burn internal combustion engines include homogenous charge compression ignition (HCCI) engines, powered either by gasoline etc. fuel or diesel fuel.

Engine management means may be provided, when in use, to contact the catalysed substrate monolith with an enriched exhaust gas for generating ammonia in situ. Such an arrangement can be used in combination with exhaust systems comprising means for injecting a nitrogenous reductant (e.g. ammonia or a precursor thereof, such as urea) between the catalysed substrate monolith and the substrate monolith comprising the SCR catalyst, or without such means. The engine management means is provided for enriching exhaust gas such that ammonia gas is generated in situ by reduction of NO$_x$ on the PGM catalyst of the catalysed substrate monolith.

In combination with an appropriately designed and managed diesel compression ignition engine, enriched exhaust gas, i.e. exhaust gas containing increased quantities of carbon monoxide and hydrocarbon relative to normal lean running mode, contacts the NAC. Components within a NAC such as PGM-promoted ceria or ceria-zirconia can promote the water-gas shift reaction, i.e. $CO_{(g)} + H_2O_{(v)} \rightarrow CO_{2(g)} + H_{2(g)}$ evolving $H_2$. From the side reaction footnote to reactions (3) and (4) set out hereinabove, e.g. $Ba(NO_3)_2 + 8H_2 \rightarrow BaO + 2NH_3 + 5H_2O$, $NH_3$ can be generated in situ and stored for NO$_x$ reduction on the downstream SCR catalyst.

An exhaust system of the present invention is illustrated in FIG. 1. Exhaust system 10 comprises, in serial arrangement from upstream to downstream, a wall-flow filter 2 coated with an oxidation catalyst formulation comprising both platinum and palladium at a weight ratio of 4:1 (known in the art as a catalysed soot filter or "CSF"); a source of ammonia 4 comprising an injector for an ammonia precursor, urea; and a downstream wall-flow filter substrate monolith 6 coated on second zone 8 on its inlet channels only with a ceria:zirconia mixed oxide having a weight ratio of 9:1 at a washcoat loading of 1.0 g/in$^3$ and coated in a first zone 11 extending throughout the entire length of the wall-flow filter with a CuCHA SCR catalyst which permeates a porous structure of the wall-flow filter. That is the second zone overlies the first zone. Each substrate monolith 2, 6 is disposed in a metal container or "can" including coned diffusers and are linked by a series of conduits 3 of smaller cross sectional area than a cross sectional area of either substrate monolith 2, 4. The coned diffuser acts to spread the flow of exhaust gas entering a housing of a "canned" substrate monolith so that the exhaust gas as a whole is directed across substantially the whole front "face" of each substrate monolith. Exhaust gas leaving substrate monolith 4 is exhausted to atmosphere at "tail pipe" 5.

EXAMPLES

Example 1

Preparation of Substrate Monolith Coated with 5 wt % Fe/Beta Zeolite

Commercially available Beta zeolite was added to an aqueous solution of Fe(NO$_3$)$_3$ with stirring. After mixing, binders and rheology modifiers were added to form a washcoat composition.

A 400 cells per square inch cordierite flow-through substrate monolith was coated with an aqueous slurry of the 5 wt % Fe/Beta zeolite sample using the method disclosed in Applicant/Assignee's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long was cut from the finished article.

Comparative Example 2

Preparation of Pt-Only Catalysed Wall-Flow Filter

A washcoat composition comprising a mixture of alumina particles milled to a relatively high particle size distribution, platinum nitrate, binders and rheology modifiers in deionised water was prepared. An aluminium titanate wall-flow filter was coated with the catalyst composition at a washcoat loading of 0.2 g/in$^3$ to a final total Pt loading of 5 g/ft$^{-3}$ using the method and apparatus disclosed in the Applicant/Assignee's WO 2011/080525, wherein channels at a first end intended for orientation to an upstream side were coated for 75% of their total length with a washcoat comprising platinum nitrate and particulate alumina from the intended upstream end thereof; and channels at an opposite end and intended to be oriented to a downstream side are coated for 25% of their total length with the same washcoat as the inlet channels. That is, the method comprised the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition was coated on filter channels from a first end, following which the coated filter was dried. The dried filter coated from the first end was then turned and the method was repeated to coat the same catalyst to filter channels from the second end, followed by drying and calcining.

A core of 1 inch (2.54 cm) diameter×3 inches (7.62 cm) long was cut from the finished article. The resulting part is described as "fresh", i.e. unaged.

Example 3

Preparation of 1:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^3$ Pt, 5 g/ft$^3$ Pd loading on both the inlet surfaces and the outlet surfaces, i.e. a total PGM loading of 10 g/ft$^3$.

A core of 1 inch (2.54 cm) diameter×3 inches long was cut from the finished article. The resulting part is described as "fresh", i.e. unaged.

Example 4

Preparation of 5:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^3$ Pt, 1 g/ft$^3$ Pd loading on both the inlet surfaces and the outlet surfaces, i.e. a total PGM loading of 6 g/ft$^3$.

A core of 1 inch (2.54 cm) diameter×3 inches long was cut from the finished article. The resulting part is described as "fresh", i.e. unaged.

Example 5

System Tests

Figure 2:
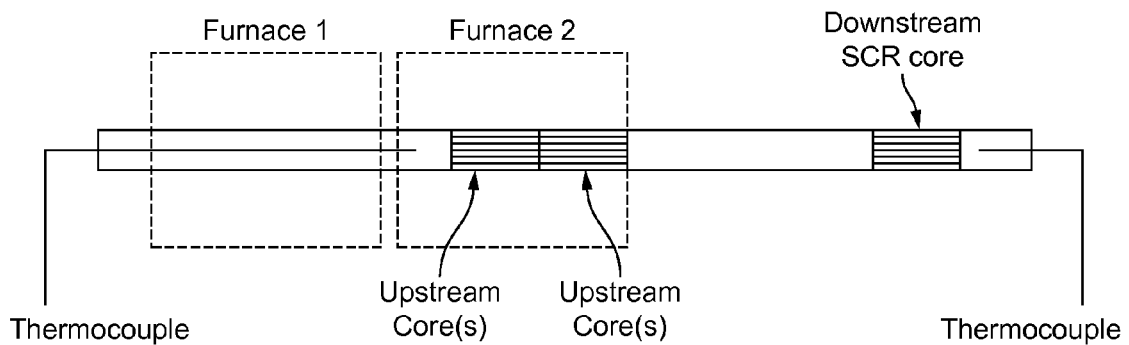
FIG. 2 is a schematic drawing of a laboratory reactor used for testing platinum contamination on a Fe/Beta zeolite SCR catalyst or a Cu/CHA zeolite SCR catalyst.

The tests were performed on a first synthetic catalyst activity test (SCAT) laboratory reactor illustrated in FIG. 2, in which a fresh core of the coated Fe/Beta zeolite SCR catalyst of Example 1 is disposed in a conduit downstream of a core of either the catalysed wall-flow filter of Comparative Example 2 or of Example 3 or 4. A synthetic gas mixture was passed through the conduit at a catalyst swept volume of 30,000 hr$^{-1}$. A furnace was used to heat (or "age") the catalysed wall-flow filter sample at a steady-state temperature at a filter inlet temperature of 900° C. for 60 minutes, during which the inlet SCR catalyst temperature was 300° C. using. An air (heat exchanger) or water cooling mechanism was used to effect the temperature drop between the filter and the SCR catalyst. The gas mixture during the ageing was 10% $O_2$, 6% $H_2O$, 6% $CO_2$, 100 ppm CO, 400 ppm NO, 100 ppm HC as Cl, balance $N_2$.

Following ageing, the aged SCR catalysts were removed from the first SCAT reactor and inserted into a second SCAT reactor specifically to test $NH_3$-SCR activity of the aged samples. The aged SCR catalysts were then tested for SCR activity at 150, 200, 250, 300, 350, 450, 550 and 650° C. using a synthetic gas mixture ($O_2$=14%; $H_2O$=7%; $CO_2$=5%; $NH_3$=250 ppm; NO=250 ppm; $NO_2$=0 ppm; $N_2$=balance) and the resulting $NO_x$ conversion was plotted against temperature for each temperature data point in FIG. 3. This plot essentially measures competition between reaction (9) and reaction (5) and thus how much reaction (9) affects the $NO_x$ conversion by consumption of the available $NH_3$ needed for the SCR reaction (reaction (5)).

Figure 3:
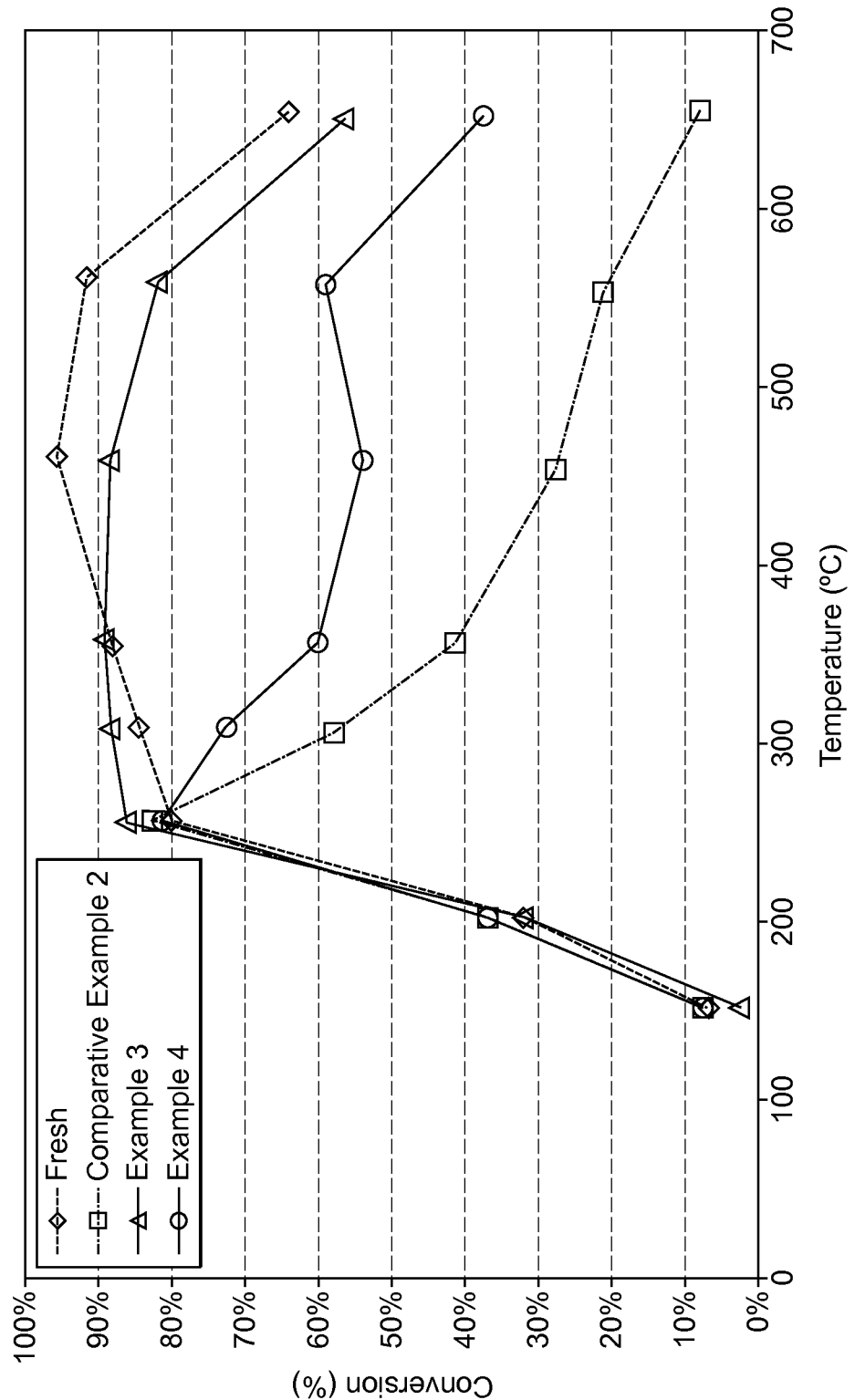
FIG. 3 is a graph comparing the $NO_x$ conversion activity as a function of temperature of three aged SCR catalyst cores each of which has been aged in a laboratory-scale exhaust system configuration containing a catalysed wall-flow filter disposed upstream of the Fe/Beta zeolite SCR catalyst of Example 1, one system comprising a filter coated on both inlet and outlet channels with Pt:Pd in a 1:1 weight ratio of Example 3; a second system comprising a filter coated on both inlet and outlet channels with a Pt:Pd in a 5:1 weight ratio of Example 4; and a third, comparative system comprising a filter coated on both inlet and outlet channels with a Pt-only catalyst according to Comparative Example 2. The results of the aged SCR activity is plotted against activity of a fresh, i.e. un-aged SCR catalyst.

The results are shown in FIG. 3. Referring to FIG. 3, it can be seen that the Fe/Beta zeolite SCR catalyst aged behind the catalysed soot filter having a Pt:Pd weight ratio of 1:0 (i.e. Comparative Example 2) has significantly reduced overall $NO_x$ conversion activity compared with the fresh sample. The catalysed soot filter of Example 4, which has a Pt:Pd weight ratio of 5:1, has improved $NO_x$ conversion activity compared with Comparative Example 2. However, Example 3, which has a Pt:Pd weight ratio of 1:1, has demonstrably similar performance to that of the unaged SCR catalyst. Substantially no loss in activity was seen between a fresh Fe/Beta catalyst and a Fe/Beta catalyst aged at 300° C. for 1 hour without any catalyst present upstream (results not shown).

Example 6

Preparation of Substrate Monolith Coated with 3 wt % Cu/CHA Zeolite

Commercially available aluminosilicate CHA zeolite was added to an aqueous solution of $Cu(NO_3)_2$ with stirring. The slurry was filtered, then washed and dried. The procedure can be repeated to achieve a desired metal loading. The final product was calcined. After mixing, binders and rheology modifiers were added to form a washcoat composition.

A 400 cells per square inch cordierite flow-through substrate monolith was coated with an aqueous slurry of the 3 wt % Cu/CHA zeolite sample using the method disclosed in Applicant/Assignee's WO 99/47260, as described in Example 1 hereinabove. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long (7.62 cm) was cut from the finished article.

Example 7

Further Pt:Pd Weight Ratio Studies

Two diesel oxidation catalysts were prepared as follows:
Diesel Oxidation Catalyst A A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the method of Example 1 hereinabove. The dosed part was dried and then calcined at 500° C. The total platinum group metal loading in the washcoat coating was 60 gft$^{-3}$ and the total Pt:Pd weight ratio was 4:1. A core of 1 inch (2.54 cm) diameter×3 inches (7.62 cm) long was cut from the finished article. The resulting part may be described as "fresh", i.e. unaged.

Diesel Oxidation Catalyst B

A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the same method as used for DOC A. The dosed part was dried and then calcined at 500° C. The total PGM loading in the single layer DOC was 120 g/ft³ and the Pt:Pd weight ratio was 2:1. A core of 1 inch (2.54 cm) diameter×3 inches (7.62 cm) long was cut from the finished article. The resulting part may be described as "fresh", i.e. unaged.

Both catalysts were tested according the protocols set out in Example 8. The results are set out in FIG. 4 with reference to a control (aged SCR catalyst that has not been further aged downstream of either DOC A or DOC B).

Example 8

System Tests

The tests were performed on a first synthetic catalyst activity test (SCAT) laboratory reactor illustrated in FIG. 2, in which an aged core of the coated Cu/CHA zeolite SCR catalyst of Example 10 was disposed in a conduit downstream of a core of either the Diesel Oxidation Catalyst (DOC) A or B (according to Example 7). A synthetic gas mixture was passed through the conduit at a rate of 6 liters per minute. A furnace was used to heat (or "age") the DOC samples at a steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could also be used as appropriate. Temperatures were determined using appropriately positioned thermocouples ($T_1$ and $T_2$). The gas mixture used during the ageing was 40% air, 50% $N_2$, 10% $H_2O$.

Following the DOC ageing, the SCR catalysts were removed from the first SCAT reactor and inserted into a second SCAT reactor specifically to test $NH_3$-SCR activity of the aged samples. The SCR catalysts were then tested for SCR activity at 500° C. using a synthetic gas mixture ($O_2$=10%; $H_2O$=5%; $CO_2$=7.5%; CO=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible $NO_x$ conversion available was 80%) and the resulting $NO_x$ conversion was plotted against temperature on the accompanying bar chart in FIG. 4. This plot essentially measures competition between reaction (9) and reaction (5) and thus how much reaction (9) affects the $NO_x$ conversion by consumption of the available $NH_3$ needed for the SCR reaction (reaction (5)).

Pt:Pd weight Ratio Study—Conclusions

Figure 4:
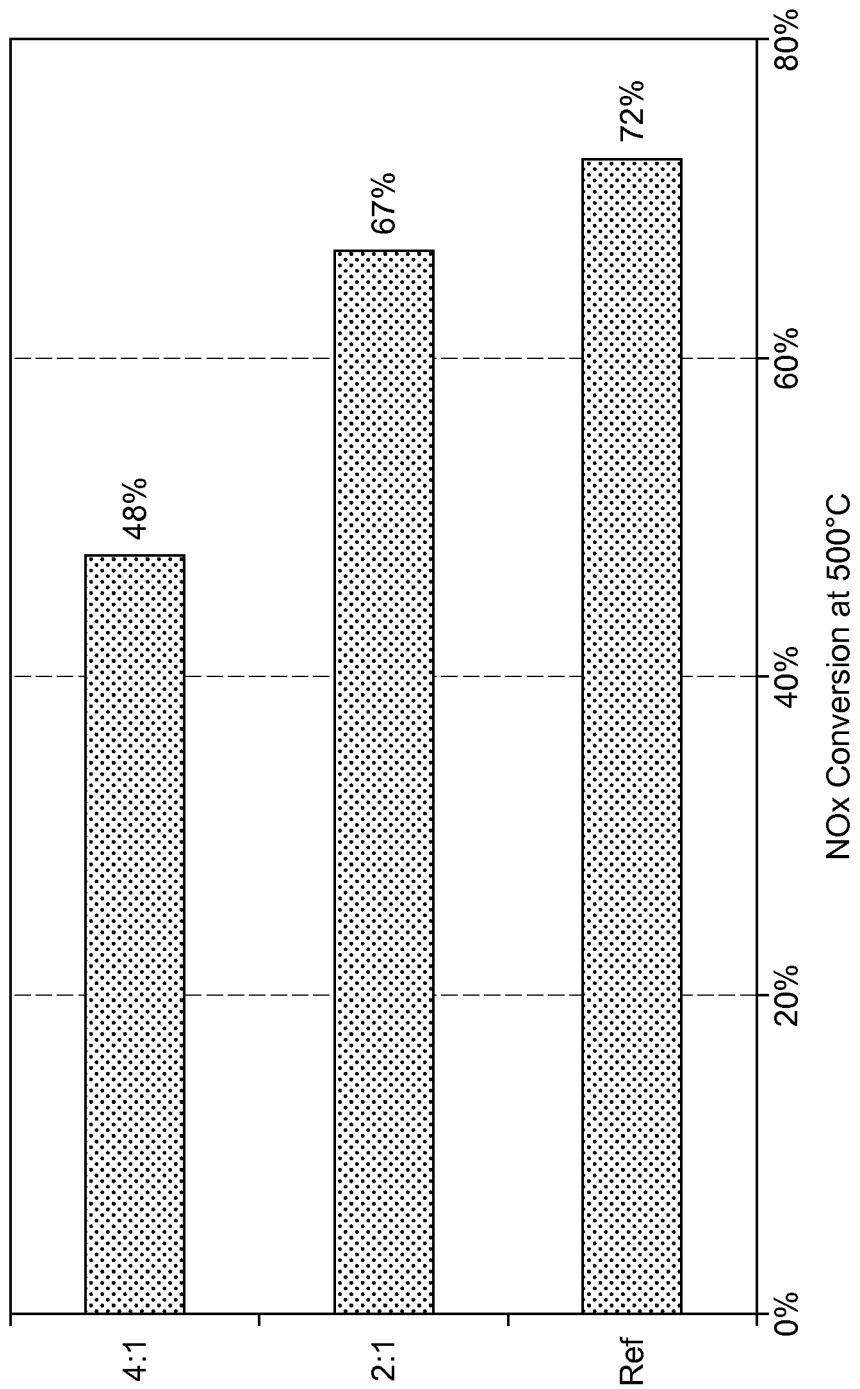
FIG. 4 is a bar chart comparing the NOx conversion activity as a function of temperature of two aged SCR catalyst cores each of which has been aged in the laboratory-scale exhaust system shown in FIG. 1 containing core samples of the diesel oxidation catalyst of Comparative Example 3 and Example 4 heated in a tube furnace at 900° C. for 2 hours in a flowing synthetic exhaust gas with the Cu/CHA zeolite SCR catalyst core held at 300° C. located downstream.

Taken as a whole, the results of Example 5 shown in FIG. 3 in connection with Examples 3 and 4 and Comparative Example 2 indicate that a Pt:Pd weight ratio of between 1:1 and 5:1 is beneficial in reducing the problem of $NO_x$ conversion activity loss through volatilisation of platinum group metal, principally platinum, from a platinum group metal containing catalyst to a downstream SCR catalyst; and The results of Example 8 shown in FIG. 4 in connection with Diesel Oxidation Catalysts A and B show that for a SCR catalyst aged downstream of a DOC having a 2:1 Pt:Pd weight ratio overall, the loss of $NO_x$ conversion activity is relatively slight at 67% $NO_x$ conversion activity compared with the control at 72% $NO_x$ conversion activity (a SCR catalyst aged behind a 1:1 Pt:Pd weight ratio overall DOC (not described herein) using the same protocol had a $NO_x$ conversion activity of 69%). However, when the overall Pt:Pd weight ratio was increased to 4:1, SCR activity was significantly reduced to 48%.

The inventors conclude, therefore, that there exists a boundary at about 2:1 Pt:Pd weight ratio overall above which Pt volatilisation is more likely to occur. Hence, by limiting to an overall Pt:Pd weight ratio of 2:1 in the DOC as a whole, and to ≤2:1 Pt:Pd weight ratio in the second washcoat coating layer, Pt in the DOC is less likely to volatilise and migrate to a downstream SCR catalyst.

For the avoidance of any doubt, the entire contents of any and all documents cited herein are incorporated herein by reference in their entirety.

The invention claimed is:

1. An exhaust system for a vehicular lean-burn internal combustion engine comprising:
   (i) a catalysed substrate monolith comprising a catalyst, wherein the catalyst comprises at least one platinum group metal (PGM), which comprises platinum (Pt) and palladium (Pd) in a weight ratio of Pt:Pd≥1.25:1; and
   (ii) a substrate monolith having a length L and comprising a first zone of substantially uniform length defined at one end by a first end of the substrate monolith, which first zone comprising a selective catalytic reduction (SCR) catalyst for reducing oxides of nitrogen with a nitrogenous reductant in exhaust gas emitted from an internal combustion engine and a second zone of substantially uniform length less than L defined at one end by a second end of the substrate monolith, wherein the second end of the substrate monolith is oriented to an upstream side, and wherein:
      (a) the second zone consists of at least one particulate metal oxide or a mixture of any two or more thereof for trapping gas phase platinum group metal (PGM), wherein the at least one particulate metal oxide is selected from the group consisting of optionally stabilised alumina, amorphous silica-alumina, optionally stabilised zirconia, titania and mixtures of any two or more thereof, which at least one particulate metal oxide does not act as a support for any other catalytic component; or
      (b) the second zone comprises a component capable of at least one of trapping or alloying with gas phase platinum group metal (PGM), which comprises (i) a metal selected from the group consisting of gold and silver, or (ii) a mixture of an alloy of palladium and gold,
   wherein the catalysed substrate monolith is disposed upstream of the substrate monolith.

2. An exhaust system according to claim 1, wherein the first zone extends over the entire length L and wherein the second zone overlies the first zone.

3. An exhaust system according to claim 2, wherein the SCR catalyst in the first zone is present as a coating on the substrate monolith.

4. An exhaust system according to claim 2, wherein (b) the second zone comprises the component capable of at least one of trapping or alloying with gas phase platinum group metal (PGM), which is supported by the SCR catalyst per se.

5. An exhaust system according to claim 2, wherein (b) the second zone comprises the component capable of at least one of trapping or alloying with gas phase platinum group metal (PGM), which comprises at least one metal oxide on which the component capable of at least one of trapping or alloying with gas phase platinum group metal (PGM) is supported.

6. An exhaust system according to claim 1, wherein the SCR catalyst in the first zone is present as a coating on the substrate monolith of substantially uniform length less than L, wherein the component capable of at least one of trapping or alloying with gas phase platinum group metal (PGM) comprises at least one metal oxide on which the component capable of at least one of trapping or alloying with gas phase platinum croup metal (PGM) is supported and wherein there is substantially no overlap between the first zone and the second zone.

7. An exhaust system according to claim 1 which is a filtering substrate monolith having inlet surfaces and outlet surfaces, wherein the inlet surfaces are separated from the outlet surfaces by a porous structure.

8. An exhaust system according to claim 7, wherein the filtering substrate monolith is a wall-flow filter, and wherein the SCR catalyst is disposed in open channels at the first end of the wall-flow filter and the second zone is disposed in open channels at the second end thereof, wherein the porous structure defines a transition between the first zone and the second zone.

9. An exhaust system according to claim 1, wherein the catalyst comprising at least one platinum group metal (PGM) is a diesel oxidation catalyst or a $NO_x$ absorber catalyst.

10. An exhaust system according to claim 1, wherein the substrate monolith which comprises a catalyst comprising platinum group metal (PGM) is a filtering substrate monolith.

11. An exhaust system according to claim 10, wherein the filtering substrate monolith is a wall-flow filter.

12. An exhaust system according to claim 1 comprising means for injecting ammonia or a precursor thereof between the catalysed substrate monolith and the substrate monolith comprising the SCR catalyst.

13. A lean-burn internal combustion engine comprising an exhaust system according to claim 1.

14. An exhaust system according to claim 1, wherein the weight ratio of Pt:Pd is greater than 2:1.

\* \* \* \* \*